United States Patent
Sutton (10) Patent No.: US 8,365,639 B2
(45) Date of Patent: Feb. 5, 2013

(54) GRIPPING DEVICES AND METHODS THEREOF

(75) Inventor: George H. Sutton, Xenia, OH (US)

(73) Assignee: Motoman, Inc., Troy, OH (US)

( * ) Notice: Subject to any disclaimer, the term of this patent is extended or adjusted under 35 U.S.C. 154(b) by 500 days.

(21) Appl. No.: 12/622,033

(22) Filed: Nov. 19, 2009

(65) Prior Publication Data

US 2010/0132511 A1 Jun. 3, 2010

Related U.S. Application Data

(60) Provisional application No. 61/116,128, filed on Nov. 19, 2008.

(51) Int. Cl.
*B67B 7/00* (2006.01)

(52) U.S. Cl. .............. 81/3.2; 81/3.4; 294/99.1

(58) Field of Classification Search ........ 81/3.2, 81/3.4, 3.31, 3.32, 3.36, 3.39, 3.43, 3.44, 81/64; 53/452, 381.4; 269/254 CS, 43, 3, 269/6, 154; 215/302; 220/274; 132/73

See application file for complete search history.

(56) References Cited

U.S. PATENT DOCUMENTS

| | | | | |
|---|---|---|---|---|
| 1,640,296 A | * | 8/1927 | Rhoads | 81/64 |
| 2,127,301 A | * | 8/1938 | Kriska | 81/3.32 |
| 2,442,795 A | * | 6/1948 | Wolfe | 81/3.44 |
| 2,447,770 A | * | 8/1948 | Ratchford | 81/3.36 |
| 2,606,707 A | | 8/1952 | Tambini et al. | |
| 3,914,920 A | | 10/1975 | Dilanni | |
| 4,172,397 A | | 10/1979 | Herbert | |
| 4,265,071 A | | 5/1981 | Smith et al. | |
| 5,826,409 A | | 10/1998 | Slepicka et al. | |
| 6,142,039 A | | 11/2000 | Herring, Sr. | |
| 6,321,619 B1 | | 11/2001 | Itoh | |
| 6,959,952 B2 | | 11/2005 | Williams | |
| 7,159,489 B2 | | 1/2007 | Itoh | |
| 2008/0028892 A1 | | 2/2008 | Cirio | |
| 2008/0078270 A1 | | 4/2008 | Shikanai et al. | |

* cited by examiner

*Primary Examiner* — Lee D Wilson
*Assistant Examiner* — Melanie Alexander
(74) *Attorney, Agent, or Firm* — Dinsmore & Shohl, LLP (57) ABSTRACT

A device for gripping a cylindrical object comprises two gripping springs and an actuator, wherein: each gripping spring comprises a first end, a second end opposite the first end, and an arcuate section disposed therebetween; the gripping springs are disposed on the device such that the first ends are pivotally coupled to the device, and the arcuate sections oppose each other so as to define an opening through which the cylindrical object is inserted; and the actuator is mechanically coupled to at least one of the second ends of the gripping springs such that movement of the actuator causes the arcuate sections of the gripping springs to grip the cylindrical object when inserted into the opening.

20 Claims, 10 Drawing Sheets

GRIPPING DEVICES AND METHODS THEREOF

CROSS-REFERENCE TO RELATED APPLICATIONS

This application claims the benefit of provisional Patent Application Ser. No. 61/116,128, filed Nov. 19, 2008.

TECHNICAL FIELD

Embodiments disclosed herein relate generally to gripping devices and related methods, and, more particularly, to devices, systems and methods for removing a cap from a cylindrical object.

BACKGROUND

Presently there is a need to quickly and efficiently remove caps or stops from cylindrical (e.g., round or elliptical) objects such as test tubes. Manual removal of caps is both painful and labor intensive, and also yields poor results. Current automatic cap removal methods are expensive because they rely on complex machinery that requires large actuating forces with respect to gripping force. Further, current removal methods do not provide for self-centering of the test tube, making cap removal automation a difficult endeavor.

SUMMARY

In one embodiment, a device for gripping a cylindrical object comprises two gripping springs and an actuator, wherein: each gripping spring comprises a first end, a second end opposite the first end, and an arcuate section disposed therebetween; the gripping springs are disposed on the device such that the first ends are pivotally coupled to the device, and the arcuate sections oppose each other so as to define an opening through which the cylindrical object is inserted; and the actuator is mechanically coupled to at least one of the second ends of the gripping springs such that movement of the actuator causes the arcuate sections of the gripping springs to grip the cylindrical object when inserted into the opening.

In another embodiment, a system for removing a cap from a cylindrical container comprises a plurality of gripping devices, an indexing table, and a decapping assembly, wherein: each of the gripping devices comprises two gripping springs and an actuator, wherein: each gripping spring comprises a first end, a second end opposite the first end, and an arcuate section disposed therebetween; the gripping springs are disposed on the system such that the first ends are pivotally coupled to the system, and the arcuate sections oppose each other so as to define an opening through which the cylindrical container is inserted; and the actuator is mechanically coupled to at least one of the second ends of the gripping springs such that movement of the actuator causes the arcuate sections of the gripping springs to grip the cylindrical container when inserted into the opening; the plurality of gripping devices are disposed on the indexing table, such that the indexing table is configured to mechanically couple the decapping assembly to one of the plurality of gripping devices; and the decapping assembly is configured to remove the cap from the cylindrical container.

In yet another embodiment, a method for gripping a cylindrical object with two gripping springs comprises: providing the two gripping springs, each comprising an arcuate section disposed to oppose each other so as to define an opening through which the cylindrical object is inserted; inserting the cylindrical object into the opening defined by the two arcuate sections of the two gripping springs; and actuating the two gripping springs such that the arcuate sections engage the cylindrical object so as to grip the cylindrical object and prevent its rotation.

BRIEF DESCRIPTION OF THE DRAWINGS

The following detailed description will be more fully understood in view of the drawings in which.

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION

Embodiments described herein relate generally to gripping devices, and, more particularly, to devices, systems and methods for gripping cylindrical objects and/or removing a cap from a cylindrical object. The cylindrical object may assume a number of different geometric shapes, sizes, and/or cross sections such as, for example, round or elliptical shapes. The cylindrical object may have a symmetric cross section (e.g., a round tube, oval tube, hexagonal, etc. or may have an asymmetric cross section. Furthermore, the edge of the cylindrical objects may have curvilinear sections, linear sections, and combinations thereof (e.g., a "D"-shaped cross section). As an example, the cylindrical object may have a hexagonal cross section, such that its edge has six linear sections. In some embodiments, the cylindrical object may be a cylindrical container such as, for example, a test tube. In other embodiments, the cylindrical object may be a substantially cylindrical plug or cap for plugging or capping a cylindrical container such as a test tube.

As set forth above and for illustration purposes only, the cylindrical object may be a test tube. Many test tubes are fragile and require care in removing a cap or plug therefrom. By the use of gripping springs and other elements, such as driving and actuating links, embodiments described herein are capable of generating effective gripping forces with minimal actuating forces. The gripping springs may be configured to wrap around and firmly secure the cylindrical object. Further, embodiments comprise compliant gripping springs that provide for self locking and self-centering of the cylindrical object within one or more of the gripping devices set forth herein. The linkages may be rotated so that the gripping springs grip the cylindrical object by any number of rotational methods, such as manual rotation, servo motor, rotary solenoid, rotary pneumatic motor, cam plate and many others. The gripping devices described herein are capable of gripping cylindrical objects of many different diameters and/or sizes.

Reference will now be made in detail to various embodiments which are illustrated in the accompanying drawings, wherein like numerals indicate similar elements throughout the views. The embodiments depicted in the drawings are intended to illustrate and not to limit.

Figure 1:
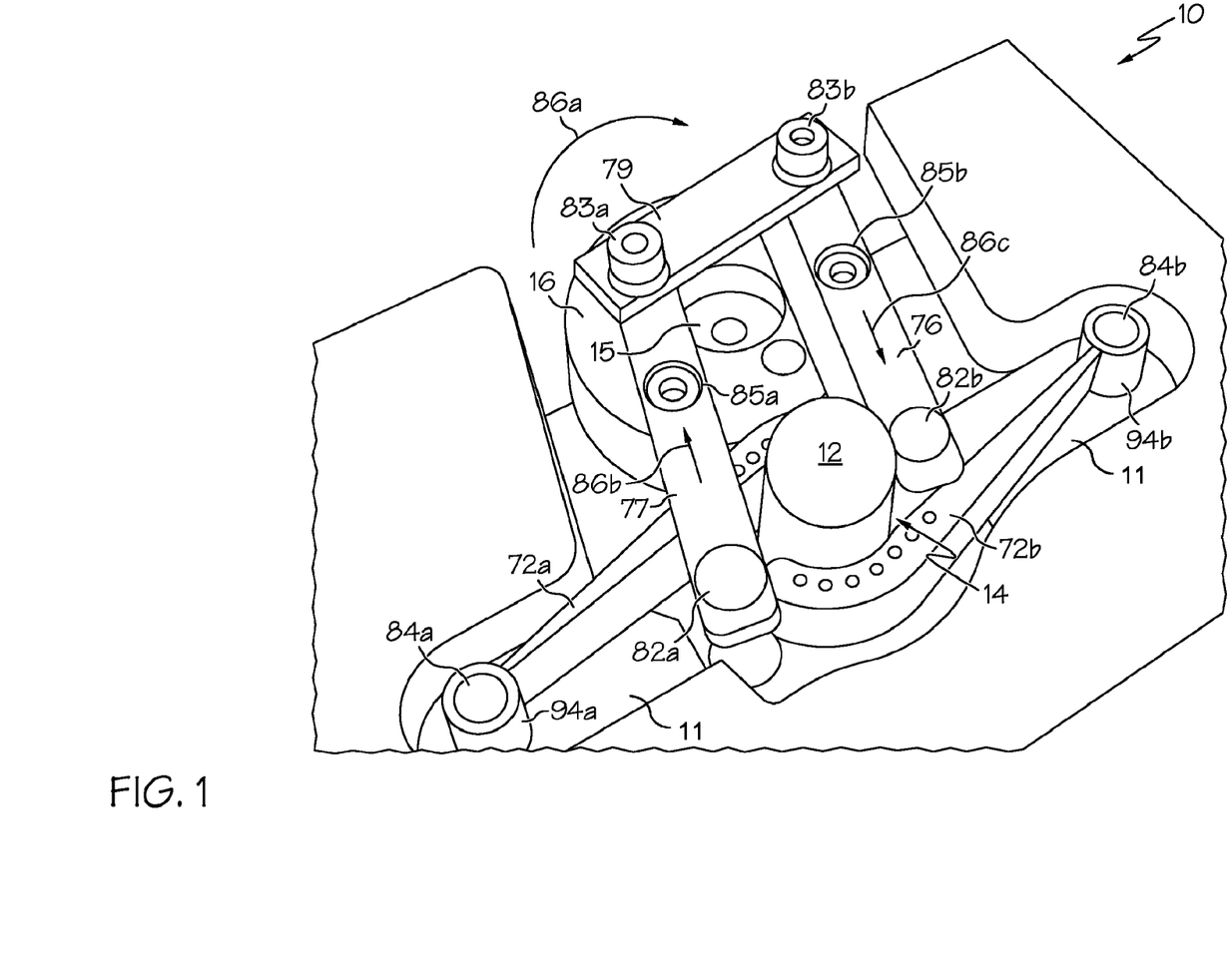
FIG. 1 is a perspective view of a gripping device gripping a cylindrical object according to one embodiment.
Figure 2A:
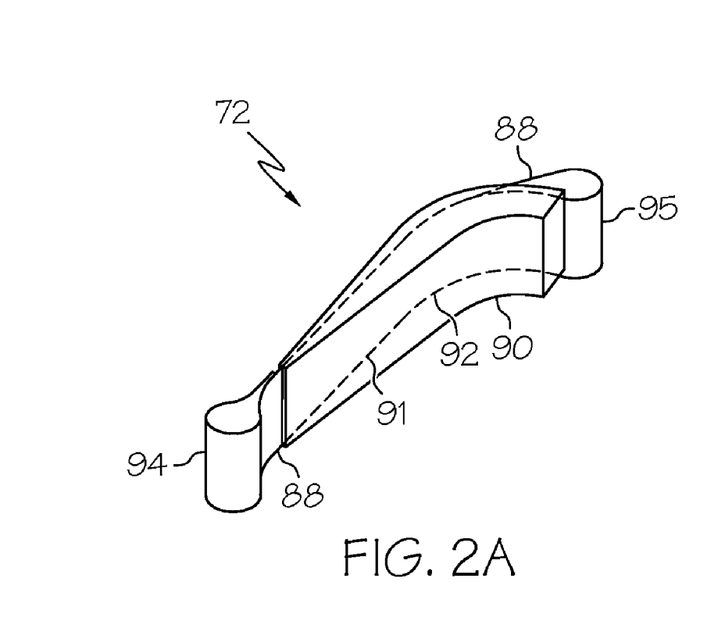
FIGS. 2A and 2B is a perspective view of gripping springs according to one embodiment.
Figure 2B:
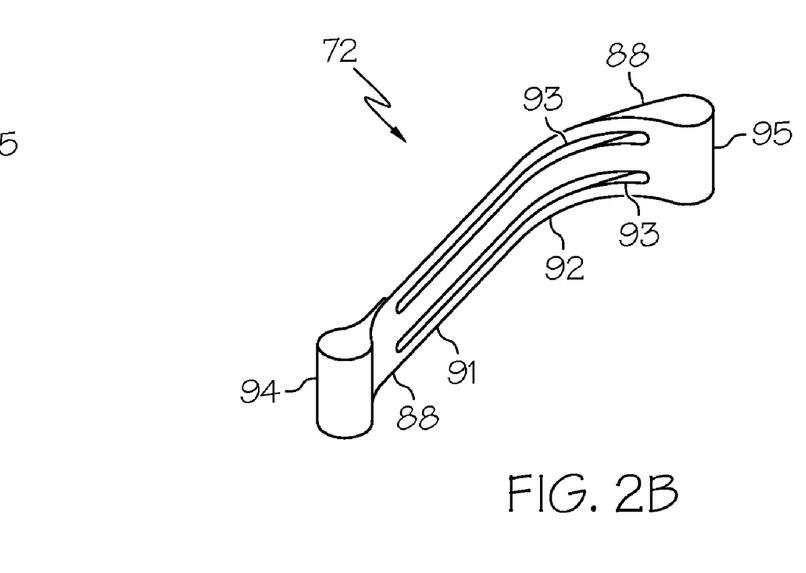

Referring initially to FIG. 1, an embodiment of a gripping device 10 holding a cylindrical object 12, such as a test tube, is illustrated. According to the illustrated embodiment, the gripping device 10 comprises two gripping springs 72a, 72b. FIG. 2A shows one embodiment of gripping springs 72, and FIG. 2B shown an alternate embodiment of gripping springs 72. As shown in FIGS. 2A and 2B, each gripping spring 72 may include a first end 94 and a second end 95. The gripping springs 72a, 72b may possess a substantially straight section 91 and an arcuate section 92, as illustrated in FIGS. 2A and 2B, such that the arcuate sections 92 of the gripping springs 72a, 72b are configured to partially surround and/or conform to the curvature of the cylindrical object 12 when the gripping device 10 is actuated. Continuing to refer to FIG. 2, the first end 94 of the gripping spring 72 may be disposed near the substantially straight section 91, and the second end 95 of the gripping spring 72 may be disposed near the arcuate section 92. Turning back to FIG. 1, the first ends 94a, 94b of the gripping springs 72a, 72b may be pivotally coupled to a body 11 of the gripping device 10 through pivot pins 84a, 84b. The second ends 95a, 95b may be secured to respective drive (or finger) links 76, 77 via link pins 82a, 82b, respectively. The drive links 76, 77, which may comprise one or more pieces, may be pivotally coupled to the actuating link 79 via respective pivot pins 83b and 83a. It is understood that any or all of the pivot pins may comprise any conventional or yet to be developed pivotal connection device such as bearings, bolt-nut connections, etc. As an alternative embodiment, the drive links 76, 77 may each comprise two pieces, an upper piece and a lower piece (not shown), which are held together via screws 85a, 85b.

The gripping device 10 may further comprise an actuator such as, for example, a solenoid 15. As illustrated in the example, a mounting plate 16 may be coupled to a rotary shaft of the solenoid 15 such that rotation of the rotary shaft of the solenoid 15 causes corresponding rotation of the mounting plate 16. As shown in FIG. 1, the drive links 76, 77 may be coupled directly to the mounting plate 16 via pivot pins 83a and 83b, respectively. In an alternative to the embodiment shown in FIG. 1, the actuating link 79 may be removed as unnecessary. As configured, the rotation of the rotary shaft of solenoid 15 in a clockwise direction as shown by arrow 86a causes the mounting plate 16 to also rotate in a clockwise direction, thus causing the drive link 76 to travel in a substantially linear direction away from the mounting plate 16 as indicated by arrow 86c; similarly this may cause drive link 77 to travel in a substantially linear direction toward the mounting plate 16 as indicated by arrow 86b. Such movement of drive links 76 and 77 cause the arcuate sections 92 of the gripping springs 72a, 72b to at least partially enclose around and grip the cylindrical object 12, thus move into a gripping position about the cylindrical object 12.

Rotation of the rotary shaft of solenoid 15 in a counter-clockwise direction (i.e., a direction opposite to arrow 86a) may have an opposite effect (i.e., drive link 76 move in direction opposite of arrow 86c and drive link 77 move in direction opposite to arrow 86b) and may cause the arcuate sections 92 of the gripping springs 72a, 72b to release the cylindrical object 12. In this fashion, operation of the actuator (e.g., solenoid 15) may cause the gripping springs 72a, 72b to effectively and safely grip (i.e., gripping position) and/or release (i.e., a release position) the cylindrical object 12. The actuating link 79 (or mounting plate 16) may be actuated or rotated in any number of ways, including, but not limited to, manual rotation, servo motor, rotary pneumatic motor and/or cam plate.

Alternatively, an actuator, such as solenoid 15, may be coupled directly to the actuating link 79 so as to be able to rotate the actuating link 79, thus producing a substantially linear motion (as illustrated by direction arrows 86a and 86b) in the drive links 76, 77. As an example, see embodiments shown in FIGS. 5-8, wherein the rotary shaft of the solenoid is pivotally connected directly to actuating link 79. As the solenoid 15 is actuated in either embodiment, the actuating link 79 (or mounting plate 16) is rotated about an axis defined by the rotary shaft of solenoid 15 (e.g., the pivot axis of the mounting plate 16 or actuating link 79 is coaxial to the rotational axis of the rotary shaft of solenoid 15).

The drive links 76 and 77 and the actuating link 79 may be made of steel, aluminum, composite material, plastics, or other appropriate materials. The lengths of the links 76, 77 and 79 may be adjusted to provide for larger or smaller diameter cylindrical objects, or to provide larger or smaller gripping torque.

Referring again to FIGS. 2A and 2B, the gripping spring 72 may comprise an inner spring 88 that may be made of a flexible material, such as steel, and be configured such that each end possesses a first end 94 and a second end 95. The inner spring 88 comprises a substantially straight section 91 and an arcuate section 92 (i.e., the compliant gripping portion) configured to wrap, flex around, and/or substantially conform to a cylindrical object (e.g., cylindrical object 12). The substantially straight section 91 may be configured to provide the gripping tension. The gripping spring 72 may further comprise a high-friction material 90, such as elastomers, urethane, etc., that surrounds the inner spring 88 and/or covers a portion, if not all of, the gripping spring 72. The high-friction material 90 may be applied to the inner spring 88 by way of molding or other appropriate processes. Gripping springs 72 may include one or more slots 93 defined in the inner spring 88 that may aid in bonding the high-friction material 90 to the inner spring 88.

As illustrated in FIG. 1, a cylindrical object 12 may be initially placed into a gripping area 14 (i.e., spaced defined by opposed gripping springs 72a and 72b) while the gripping device 10 is in an opened position and ready to receive the cylindrical object 12. To grip the cylindrical object 12, the actuating link 79 (or mounting plate 16) is rotated or pivoted in a suitable direction for proper gripping the cylindrical object 12 with the gripping springs 72a and 72b (e.g., clockwise direction 86a in FIG. 1). As the actuating link 79 (or mounting plate 16) rotates or pivots, the drive links 76, 77 move in a substantially linear fashion (e.g., direction 86c and 86b, respectively), which causes the gripping springs 72a, 72b to at least partially wrap around and/or grip the cylindrical object 12. Although not to be limited by theory, it is believed that the arcuate configuration of the gripping springs 72a, 72b assist in guiding the cylindrical object to a centered position within the gripping area 14, thus providing an automatically self-centering benefit to the griping device 10. For example and again not to be limited by theory, assume a cylindrical object 12 is placed into the gripping area 14 and is initially closer to drive link 76 than it is to drive link 77 (i.e., the cylindrical object 12 is not centered). When the gripping springs 72a, 72b are actuated to a gripping position as shown in FIG. 1, the arcuate section of the gripping spring 72a may initially contact the cylindrical object 12 at a point relatively close to the second end (not shown), while the arcuate section of the gripping spring 72b may initially contact the cylindrical object 12 at a point relatively far from the second end (not shown). Due to the slightly different contact locations on the gripping springs 72a, 72b, the cylindrical object 12 may be forced to the center of the gripping area 14 as the gripping springs 72a, 72b, continue to wrap around the cylindrical object.

As another example of self-centering, and not to be limited by theory, assume a cylindrical object 12 is placed into the gripping area 14 and is initially closer to gripping spring 72a than gripping spring 72b (i.e., the cylindrical object 12 is not centered). When the gripping springs 72a, 72b are actuated into a gripping position, the gripping spring 72a may initially contact the cylindrical object 12 first, thus pushing the cylindrical object 12 toward gripping spring 72b. As both gripping springs 72a, 72b continue to close, gripping spring 72b will eventually contact the cylindrical object 12 as well. In this fashion, the actuation of the gripping springs 72a, 72b may cause the cylindrical object 12 to automatically be centered as they come into contact with and wrap around the cylindrical object 12 (i.e., gripping position).

Because the actuator (e.g., solenoid 15) and any associated components may be physically offset from the cylindrical object 12, the gripping device 10 may have a compact configuration. The gripping device 10 also may provide for self tightening and self locking. This may be due to the design of the gripping springs 72a, 72b. For example, as shown in FIG. 1, the gripping springs 72a, 72b may hold a cylindrical object 12 when the gripping device 10 is actuated. As the cylindrical object 12 is held by the gripping springs 72a, 72b, any attempted rotation (e.g., in a clockwise direction indicated by arrow 86a) of the cylindrical object 12 may cause the gripping springs 72a, 72b to further wrap around the cylindrical object 12 due to the mechanical coupling of the gripping springs 72a, 72b to the cylindrical object 12. This may provide an additional self-tightening function benefit for the gripping device 10 and may help prevent the cylindrical object 12 from rotating within the gripping springs 72 when external rotational forces are placed upon it (e.g., when a cap is being removed from the cylindrical object 12).

Moreover, the simple configuration allows for the gripping device 10 to tighten about a cylindrical object 12 in one direction (e.g., mounting plate 16 and/or actuating link 79 moves in a clockwise direction as indicated by arrow 86a according to one embodiment) and loosen about a cylindrical object 12 in the opposition direction (e.g., mounting plate 16 and/or actuating link 79 moves counter-clockwise according to one embodiment). The use of the gripping springs 72a, 72b, mounting plate 16 (and/or actuating link 79) and drive links 76 and 77 may allow for the accommodation of a large variation in diameters and/or widths of the cylindrical objects 12. More particularly, because the gripping springs 72a, 72b at least partially wrap around the cylindrical object 12, compliance with many different sized and shaped cylindrical objects may be achieved. For example, cylindrical objects having sharp edges (e.g., an object having a hexagonal cross section) may be accommodated by the gripping device 10. Also, cylindrical objects which do not have a symmetrical cross section may be accommodated as well. In short, the gripping device may be able to accept a variety of objects having various shapes and sizes.

The self-tightening or self-locking feature may also enable the use of relatively small actuating forces to generate large gripping forces. Torque ratio, as used herein, is defined as the ratio between the actuating torque (e.g., generated by solenoid 15) and the gripping torque (e.g., the torque acting on and/or applied to the cylindrical object 12 when gripped by the gripping device 10). The torque ratio may be smaller for cylindrical objects having a smaller diameter. The use of high-friction materials 90 (e.g., elastomers) of different durometers slightly changes the amount of gripper torque achieved, but the torque ratio remains very similar.

Figure 3A:
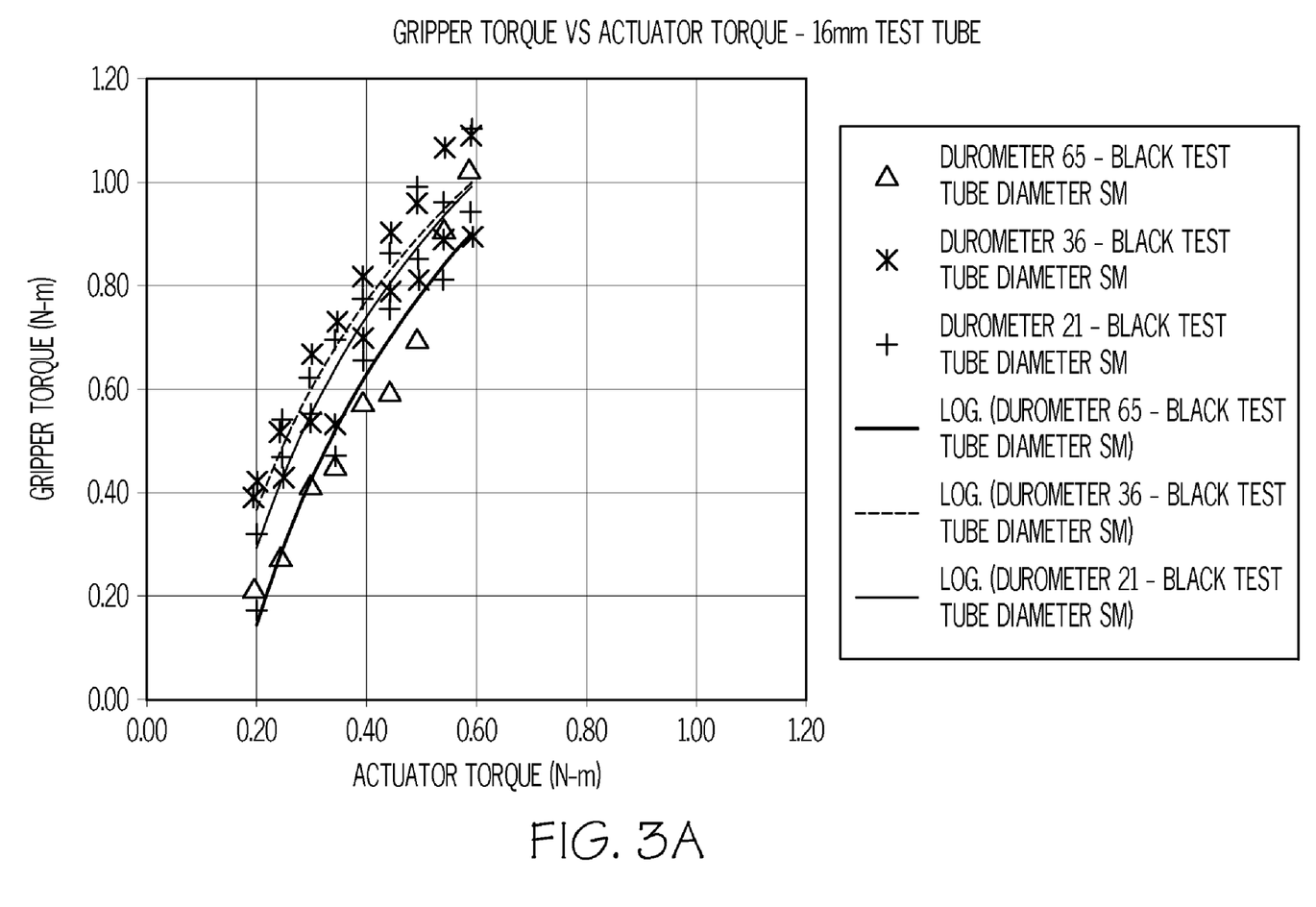
FIGS. 3A and 3B depict the ratio between the gripper torque and the actuator torque according to one embodiment.
Figure 3B:
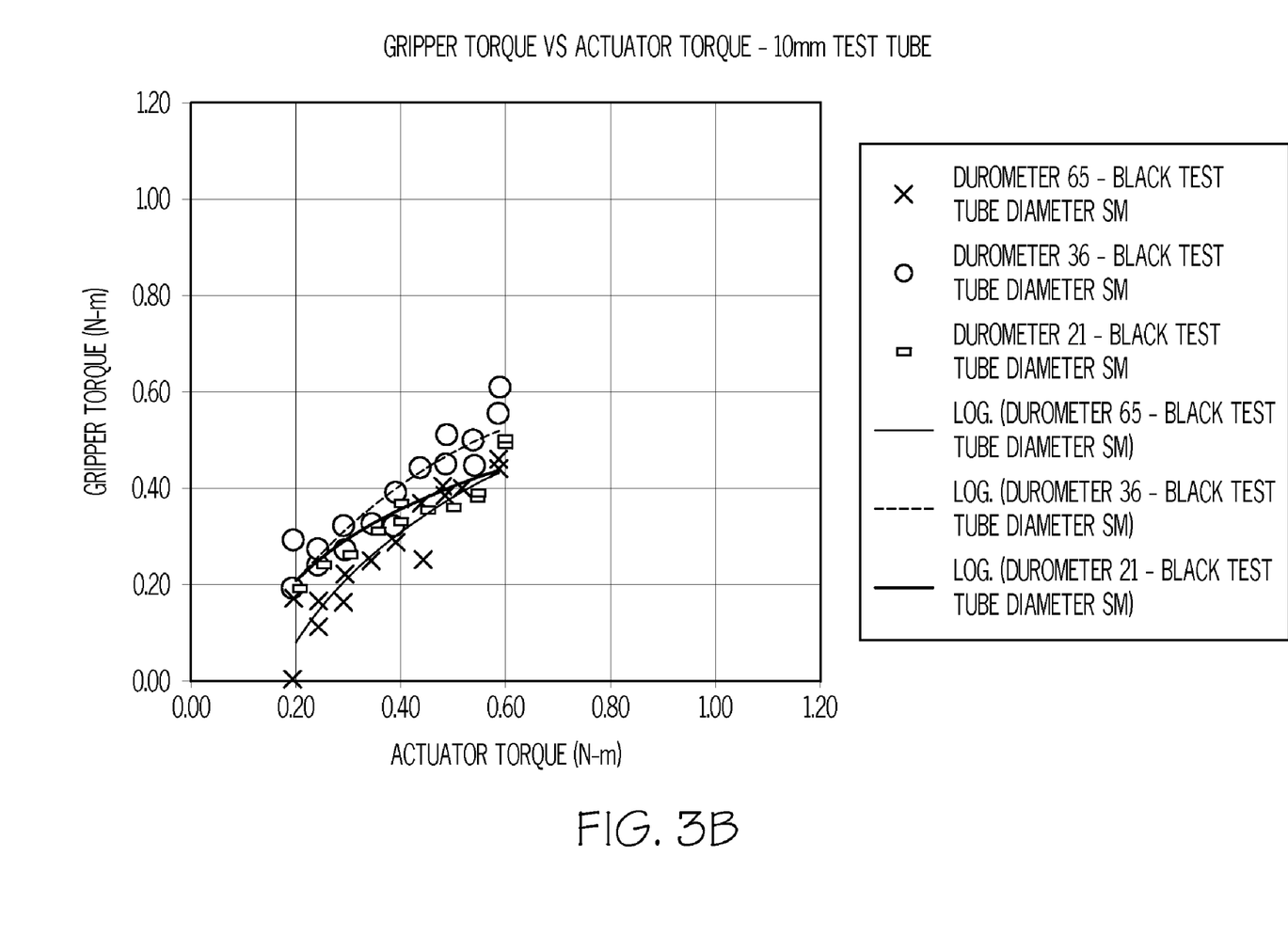

As an example and not a limitation, an experiment was performed on a gripping device 10 to determine the affect of different high-friction material 90 (i.e., elastomer) durometers on actuating torque and the resulting gripper torque as applied to two sizes of glass tubes (e.g., 10 mm and 16 mm). A torque gage was used to generate the actuating torque while the resulting gripping torque was measured with a digital torque wrench. The durometer of the elastomer had a range from 21 A to 65 A ("A" scale). As illustrated FIGS. 3A and 3B, the actuating torque was within a range of 0.2 N-m to 0.6 N-m and resulted in a gripper torque range of 0.2 N-m to 1.1 N-m, and a torque ratio from about 0.5 to 2.8 depending on the test tube size and durometer. Referring to FIG. 3A, the torque ratio (slope) remained very similar for the durometers of 65, 36 and 21 that were tested on 16 mm tubes. Referring to FIG. 3B, the torque ratio (slope) is shown when applied to 10 mm tubes.

The embodiments of the gripping device 10 described above may be implemented into automated cap removal applications. For example, an embodiment of an automated cap removal system 108 is illustrated in FIGS. 4-9. The cap to be removed from the cylindrical object by the automated cap removal system 108 may be a screw cap, cork, plug, or other similar device which may close off or seal a cylindrical object, such as a test tube. The cap may have a different shape and/or size (e.g., diameter) than the cylindrical object. Still referring initially to FIGS. 4-9, the illustrated cap removal system 108 comprises a decapping assembly 18, a holding and indexing assembly 68, a linear slide 40 and a servo motor 98. Generally, as a system overview, the cap removal system 108 removes caps or plugs from cylindrical objects as set forth above herein, such as test tubes, by holding a bottom portion of the cylindrical object at the holding and indexing assembly 18 while the decapping assembly 18 is lowered along the linear slide 40 onto the cap of the cylindrical object. The decapping assembly 18 secures the cap with a gripping device 10D (FIG. 9), twists and then pulls the cap out of or from the cylindrical object by raising back up along the linear slide 40. The decapping assembly 18 and its respective gripping device 10D will be described in detail below herein.

Figure 8:
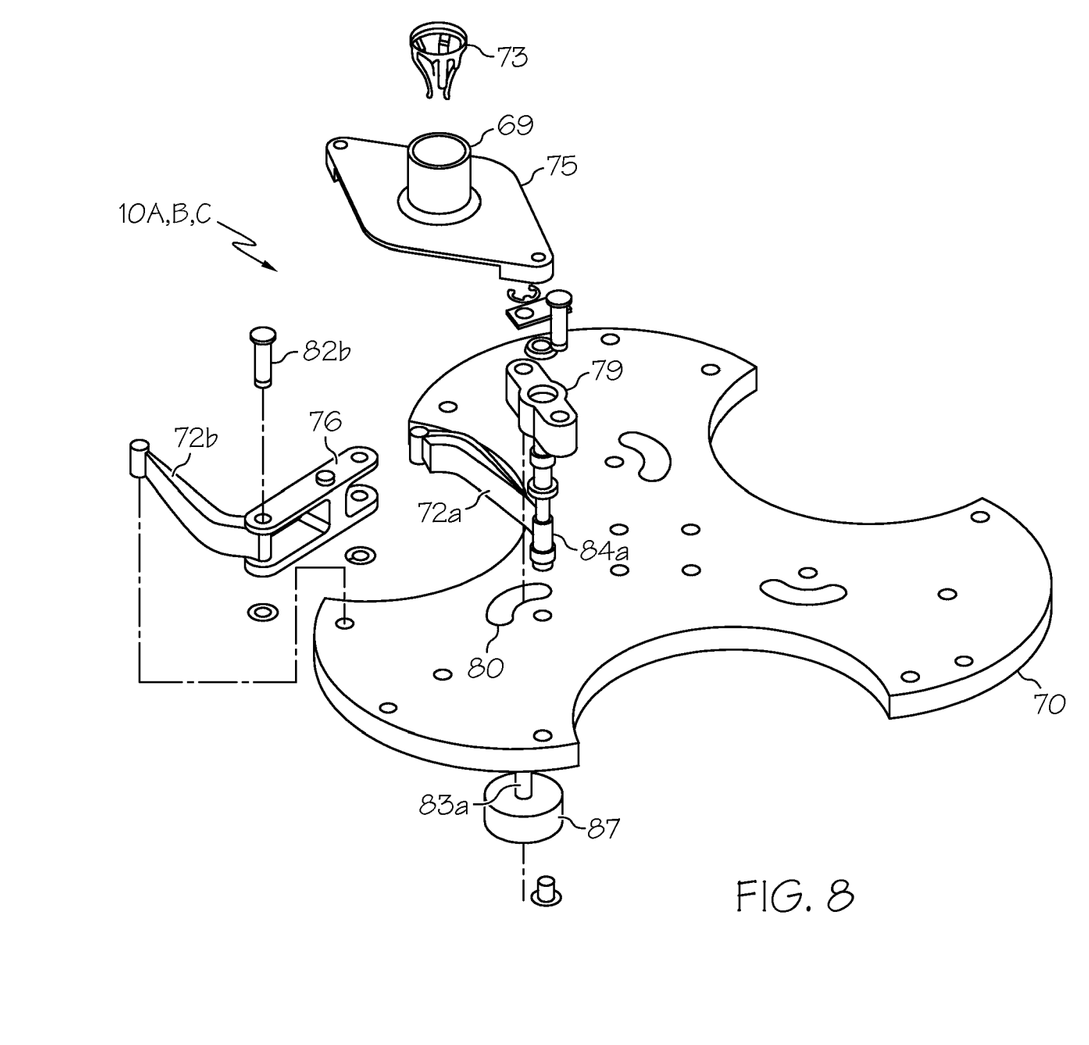
FIG. 8 is a partial exploded view of a plurality of gripping devices secured to an index table according to one embodiment.

More particularly, the holding and indexing assembly 68 comprises an indexing plate 70 having three stations 60A, 60B and 60C. Although the illustrated embodiment comprises a three-station indexing plate 70, it is contemplated that other embodiments may comprise more or fewer stations. Each station 60A-C comprises a respective gripping device 10A, 10B, and 10C that is operable to grip and/or hold a cylindrical object as described above (see FIG. 6). According to the illustrated embodiment, each station also comprises a locator plate 75, which further comprises a guide 69 and an insert 73 for easy insertion and location of a cylindrical object. Insert 73 includes fingers that may be spring-biased inwardly which hold and center the cylindrical object within the gripping area 14 until the gripping springs 72a and 72b grip the cylindrical object. It is understood that stations 60B and 60C comprise substantially the same components as station 60A and thus will not be described herein. The actuating link 79 is rotably attached to the indexing plate 70 by a pivot pin 83a assembly as illustrated in FIG. 8. The pivot pin 83a assembly is connected to a cam follower bearing 87 on the underside of the indexing plate 70. One end of each of the actuating links 79 is attached to two of three springs 71a-c that connect to each actuating link 79 positioned on the indexing plate 70. The springs 71a-c aid the gripping springs 72 in at least partially wrapping around, gripping, and/or conforming to the cylindrical object. The same end of the each actuating link 79 is also pivotally connected to a drive link 77 via pivot pin 83a (FIG. 6) which is configured to slideably rest in arcuate slot 80.

Figure 4:
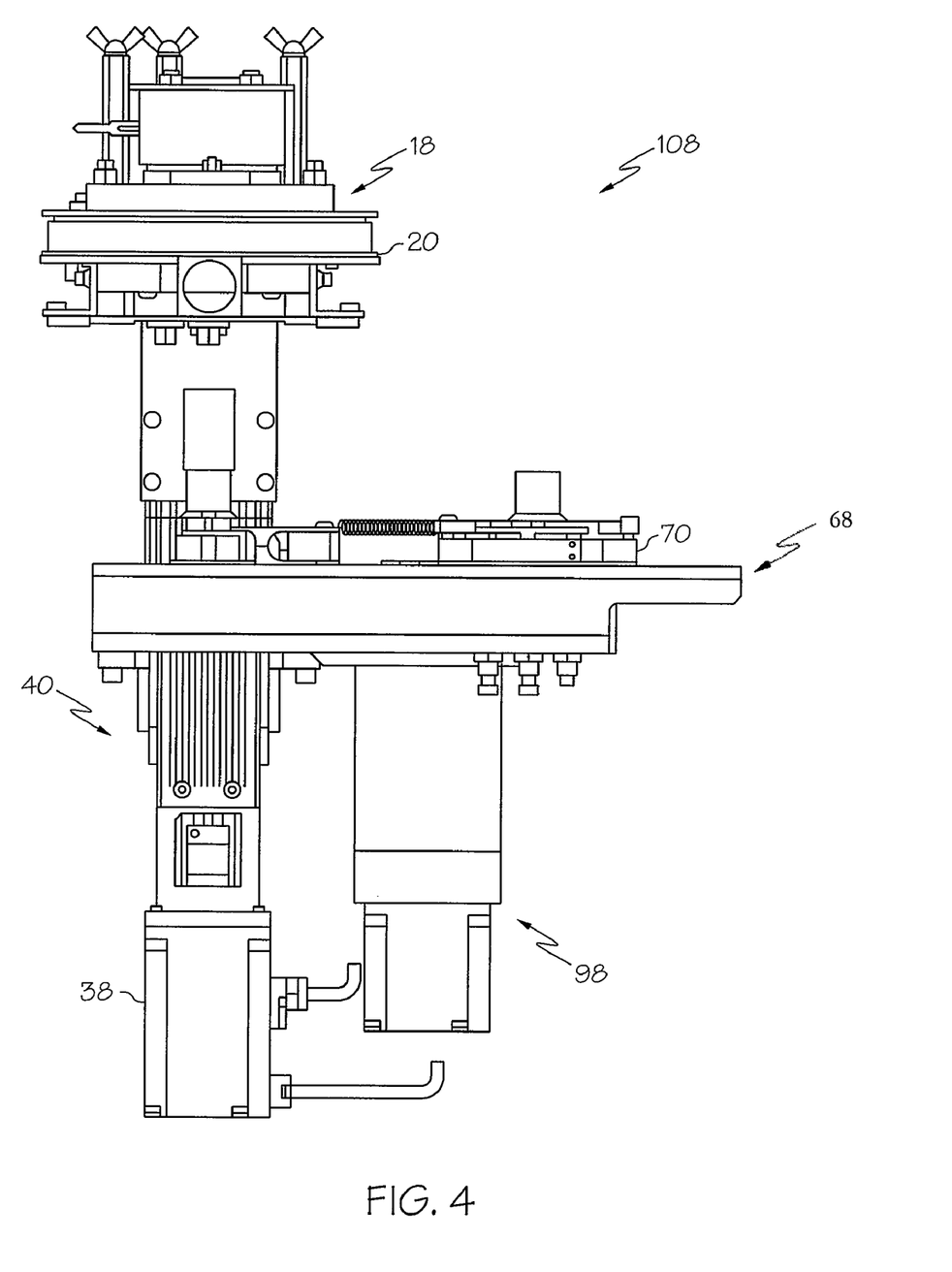
FIG. 4 is a side elevational view of a cap removal system according to one embodiment.
Figure 5:
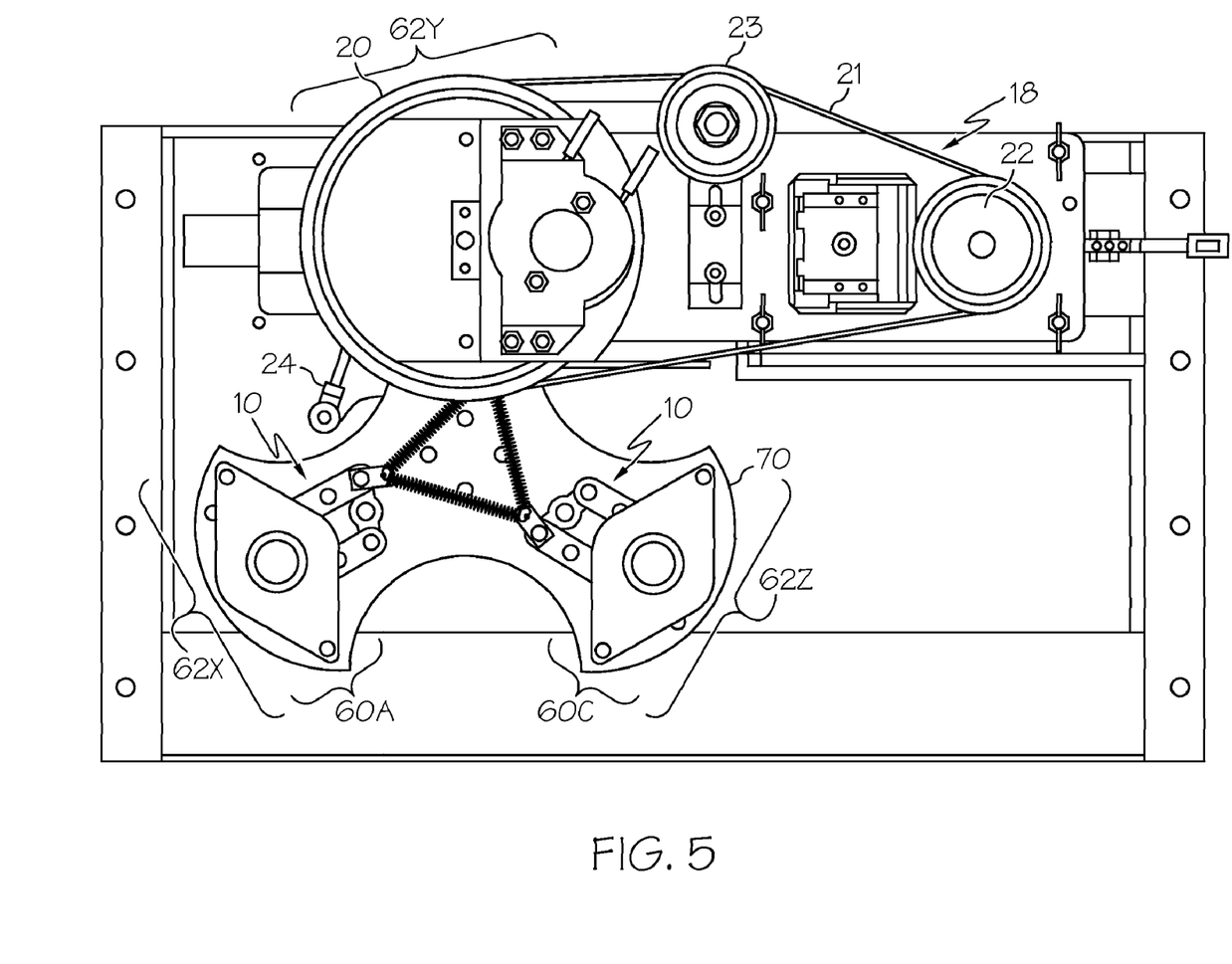
FIG. 5 is a top planar view of a cap removal system according to one embodiment.

According to the illustrated embodiment, the indexing plate 70 is indexed (i.e., rotated) by servo motor 98 (FIG. 4). The indexing assembly 68 may have three indexing positions 62X, 62Y, and 62Z such that the indexing positions 62X-Z are substantially fixed with respect to the indexing assembly 68 and the indexing plate 70 may be indexed (e.g., rotated) between the indexing positions 62X, 62Y, and 62Z. Generally, there may be the same number of indexing positions (e.g., positions 62X-Z) as stations (e.g., stations 60A-B), such that one station may be disposed at a single indexing position at any particular time. For example, as illustrated in FIG. 5, station 60A may be disposed at indexing position 62X, station 60B may be disposed at indexing position 62Y, and station 60C may be disposed at position 62Z. The indexing plate 70 may be indexed such that each one of the stations 60A-C may be disposed at any of the indexing positions 62X-Z. In continuing with the above example, the indexing plate 70 may be indexed clockwise 120 mechanical degrees such that station 60C may be disposed at indexing position 62X, station 60A may be disposed at indexing position 62Y, and station 60B may be disposed at indexing position 62Z. As shown in FIG. 5, the indexing assembly 68 may also comprise an index gripping cam 24 which permits the indexing plate 70 to only index (rotate) in one direction. The system may be designed so that the indexing plate 70 is indexed counterclockwise, if desired.

Each of the indexing positions 62X-Z may perform a specific function in the decapping process. For example, at indexing position 62X, a first cylindrical object may be inserted into the insert 73 of a first gripping device indexed at this position (e.g., gripping device 10A of station 60A); once the gripping device is indexed from indexing position 62X to 62Y, the first cylindrical object held by insert 73 may be gripped by the first gripping device indexed at this position (e.g., gripping device 10A) while the decapping assembly 18 is lowered along the linear slide 40 to grip a cap on this first cylindrical object with the gripping device 10D and to twist the cap while the decapping assembly 18 is raised back up along the linear slide 40 to remove the cap from the first cylindrical object; and finally, once the first gripping device is indexed from position 62Y to 62Z, the first cylindrical object may be released by the first gripping device (e.g., first gripping device 10A). Thus, when a indexing station 60A-C and its corresponding gripping device 10A-C is indexed at a corresponding indexing position (e.g., indexing positions 62X, 62Y, and 62Z, respectively as shown in FIG. 5), the operations at each of these corresponding indexing stations and positions may be performed simultaneously, Continuing to follow this example, as the gripping device 10A is indexed at position 62X, the gripping device 10B will be located at station 62Y, and the gripping device 10C will be located at 62Z wherein the corresponding operations will be performed at the respective positions as set forth above. Similarly, as the gripping device 10A is indexed at position 62Y, the gripping device 10B will be located at station 62Z, and the gripping device 10C will be located at station 62X, wherein the corresponding operations will be performed at the respective positions as set forth above. Also, as the gripping device 10A is indexed at position 62Z, the gripping device 10B will be located at station 62X, and the gripping device 10C will be located at station 62Y, wherein the corresponding operations will be performed at the respective positions as set forth above. In this fashion, the indexing positions 62X-Z may perform specific functions in parallel such that the throughput of the overall decapping process is improved. Other indexing positions may be added, if desired, which may provide additional functionality.

Figure 6:
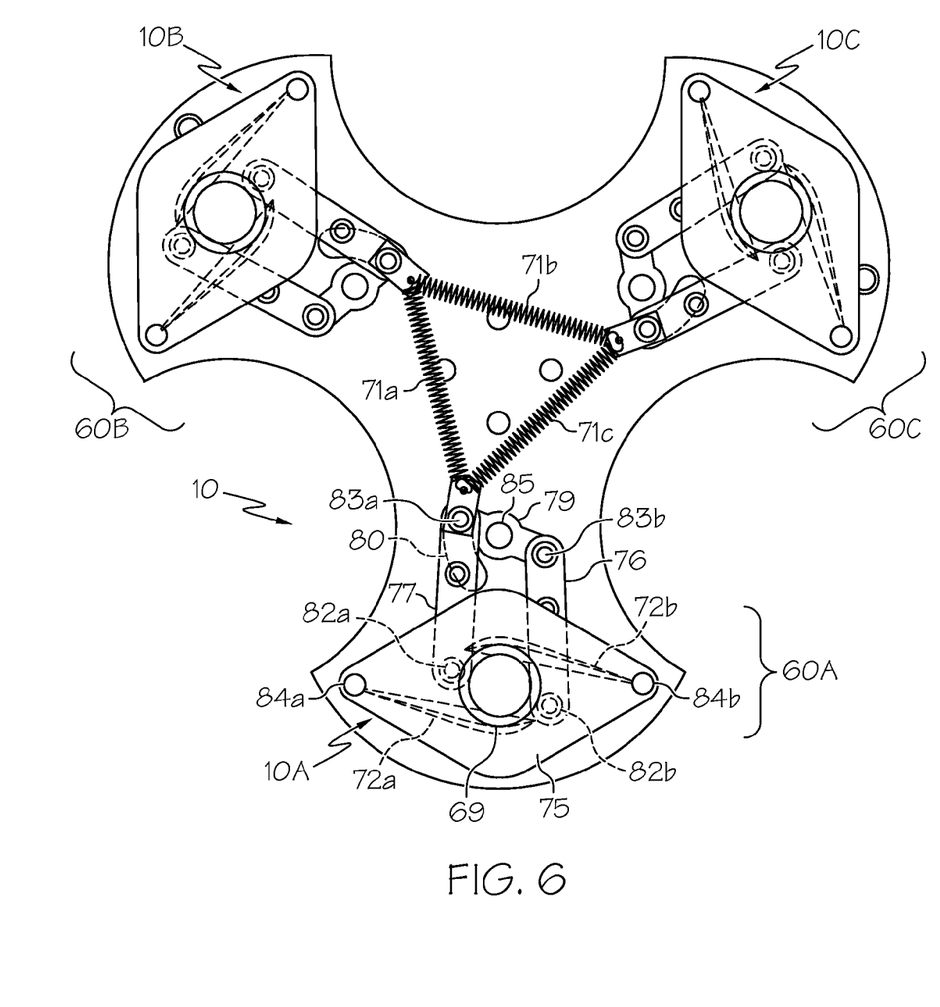
FIG. 6 is a top planar view of a plurality gripping devices secured to an index table according to one embodiment.
Figure 7:
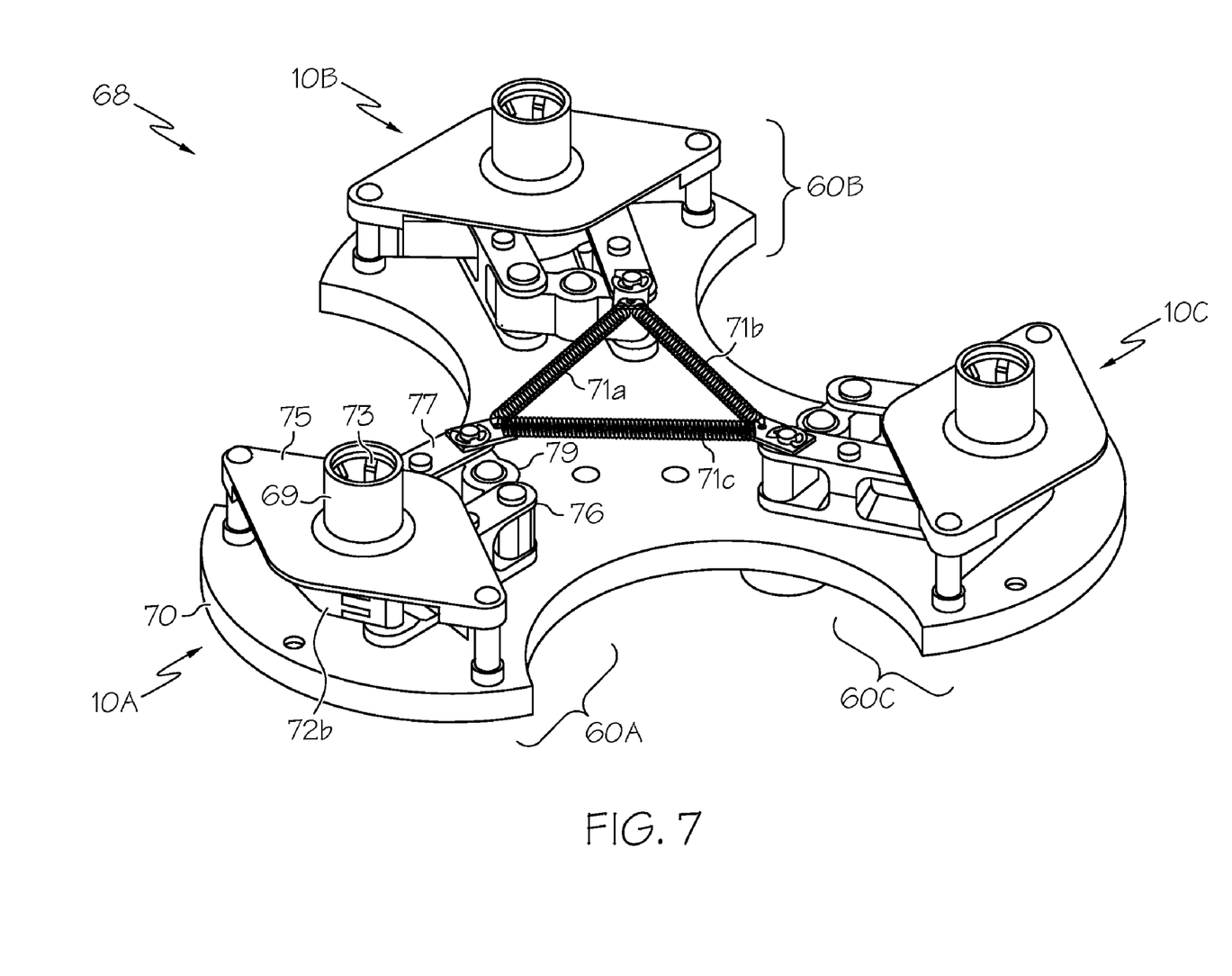
FIG. 7 is a perspective view of the plurality of gripping devices secured to an index table illustrated in FIG. 6.

Rather than actuating the gripping devices 10A-C by a rotary solenoid, the illustrated embodiment actuates the gripping devices 10A-C by a cam (not shown) and a cam follower bearing 87. Each gripping device 10A-C comprises its own respective cam follower bearing 87A-C. The cam is positioned under the indexing plate 70 and shaped such that the cam follower bearings 87A-C engage and disengages the cam depending upon what indexing position an indexing station is located at. For example, the cam follower bearings 87A-C do not engage the cam at indexing positions 62X or 62Z, and therefore, when at these positions, the gripper devices 10A-C are in an open position. In an open position, the gripping devices are not gripping a cylindrical object. As the indexing plate 70 is indexed (i.e., rotated) such that an indexing station 60A-C and its respective gripping device 10A-C is indexed into position 62Y, the cam follower bearing 87 contacts and engages the cam, which causes the actuating link 79 to rotate at this indexing position. As shown in FIG. 6, as the actuating link 79 rotates (e.g., counterclockwise), pivot pin 83a moves within arcuate slot 80 and both gripping springs 72a and 72b wrap and/or flex around and grip the cylindrical object as described above. Finally, as the table rotates one more time, and the station moves to indexing position 62Z, the cam follower bearing 87 no longer engages the cam, which causes the actuating link 79 to rotate the opposite direction (e.g., clockwise) moving the two respective gripper springs (e.g., 72a and 72b) to an open position. As such, the gripping springs releases the cylindrical object, which may now be removed from the gripping device by manual or automatic methods. In this manner, the gripping devices 10A-C are actuated without the need for additional servo motors, solenoids or the like.

Figure 9:
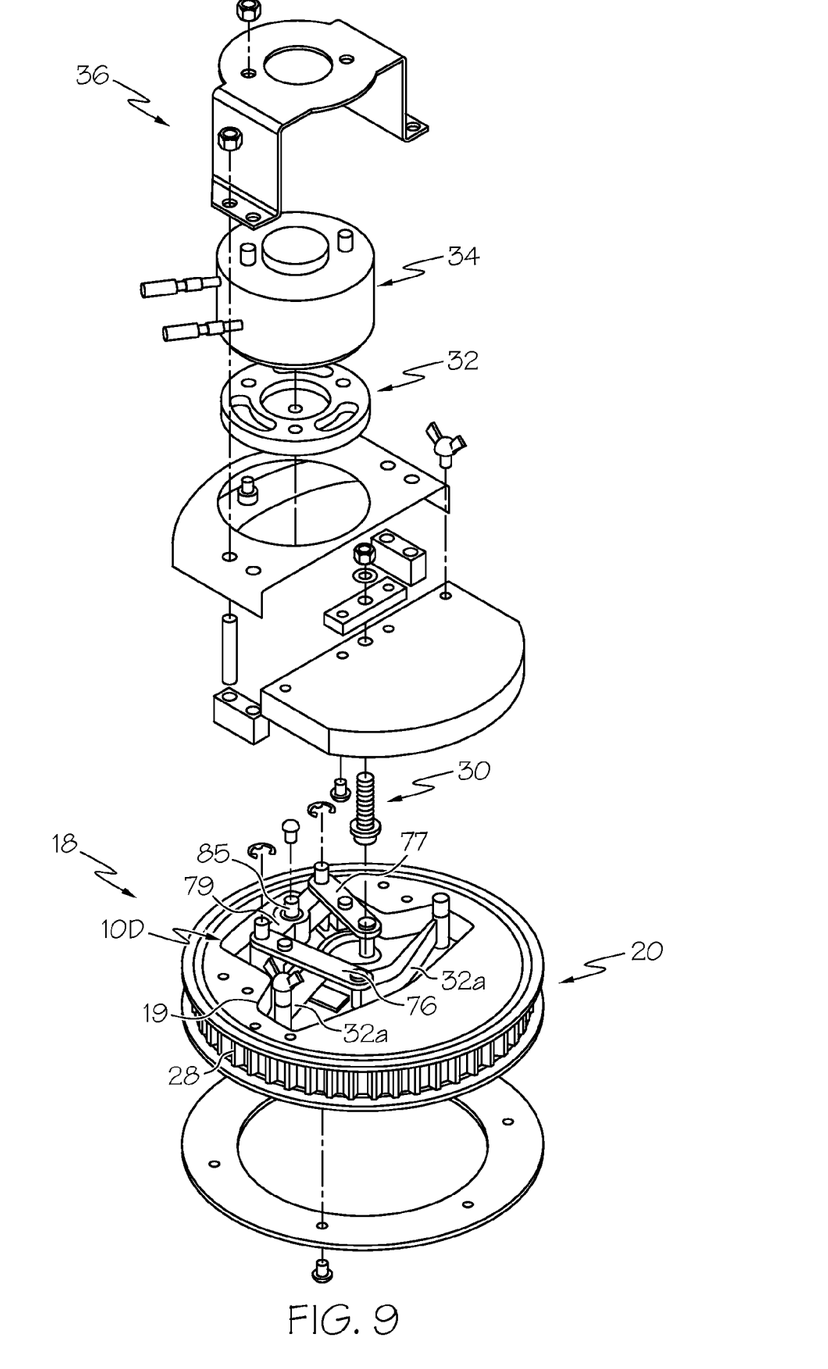
FIG. 9 illustrates an exploded view of a cap gripping assembly according to one embodiment.

As set forth above, at indexing position 62Y, the decapping assembly 18, which comprises a timing sprocket 20 with the gripping device 10D (FIG. 9) enclosed therein, may travel down the linear slide 40 via a linear servo motor 38 (FIG. 4) and grip, twist, and pull a cap off and/or from a cylindrical object. For example and referring to FIG. 9, the gripping device 10D may be positioned inside of the timing sprocket 20. The timing sprocket 20 may have a recess 19 within which the gripping device 10D is located. The drive links 76 and 77 may be of a longer length than the lengths of the holding gripping devices 10 10A-C described above to add more stroke in order to more effectively grip the cap or plug. According to one embodiment, the gripping device 10D is actuated by a rotary solenoid 34 that is mounted on top of the timing sprocket 20 and coupled to the actuating link 79 via adapter plate 32. The rotary solenoid 34 may be mounted onto the timing sprocket 20 via housing 36 and related hardware. Referring to FIGS. 5 and 9, a timing belt 21 is positioned around the teeth 28 of the timing sprocket 20 and a servo motor 22 which drives the timing belt 21 as described above. A tension pulley 23 may also be provided in order to keep a relatively constant tension on the timing belt 21. The servo motor 22 rotates the decapping assembly 18 to provide the twisting motion that aids in removing the cap from the cylindrical object.

More specifically, as the indexing plate 70 rotates and a cylindrical object is positioned under the decapping assembly 18, the decapping assembly vertically slides down the linear slide 40 such that the cap is positioned within the opened gripping device 10D that is incorporated into the timing sprocket 20. The rotary solenoid 34 is actuated, which then rotates actuating link 79, thereby causing the gripping springs 72a and 72b to wrap around the cap of the cylindrical object. After the cap is gripped by the gripping device 10D, the decapping assembly 18 both rises on linear slide 40 and rotates via the servo motor 22. These twisting and pulling motions remove the cap or plug from the cylindrical object. As the indexing plate 70 is indexed, the rotary solenoid 34 is then de-actuated which causes the gripping device 10D to release the cap, assisted by the springing force provided by the ejector pin assembly 30. In an alternative embodiment, the cap may also be ejected from the decapping assembly by a solenoid-driven ejector pin. The timing of the release of the cap and the rotation of the indexing plate 70 is such that the cap falls into a chute or a bin between decapping stations as the indexing plate 70 is indexed. The indexing plate 70 is shaped and configured so that the cap may fall into the chute between stations.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The above description and drawings are only to be considered illustrative of the embodiments, which achieve the features and advantages of the present invention. The invention is not to be considered as being limited by the foregoing description and drawings, but is only limited by the scope of the appended claims.

What is claimed is:

1. A device for gripping a cylindrical object, the device comprising a body, two gripping springs and an actuator, wherein:
   each gripping spring comprises a first end, a second end opposite the first end, and an arcuate section disposed therebetween;
   the gripping springs are disposed on the device such that the first ends are pivotally coupled to the body of the device, and the arcuate sections oppose each other so as to define an opening through which the cylindrical object is inserted; and
   the actuator is mechanically coupled to the second ends of the gripping springs such that movement of the actuator causes the arcuate sections of the gripping springs to grip the cylindrical object when inserted into the opening.

2. The device of claim 1, wherein the actuator comprises a rotary actuator.

3. The device of claim 2 further comprising two actuating links, wherein each of the two actuating links mechanically couples each of the second ends of the two gripping springs to the rotary actuator, such that rotation of the rotary actuator causes the two actuating links to move and cause the arcuate sections of the gripping springs to move from a first position to a second position.

4. The device of claim 1, wherein the cylindrical object comprises a test tube, or the cylindrical object comprises a cap for a container.

5. The device of claim 1, wherein each gripping spring further comprises a high-friction material disposed on the arcuate sections.

6. The device of claim 1, wherein the device prevents rotation of the cylindrical object when gripped by the gripping springs.

7. A method of using the device for gripping according to claim 1, the method comprising:
   inserting the cylindrical object into the opening defined by the two arcuate sections of the two gripping springs; and
   actuating the two gripping springs such that the arcuate sections engage the cylindrical object so as to grip the cylindrical object and prevent its rotation.

8. A system for removing a cap from a cylindrical object, the system comprising a plurality of gripping devices, an indexing table, and a decapping assembly, wherein:
   each of the gripping devices comprises two gripping springs and an actuator, wherein:
      each gripping spring comprises a first end, a second end opposite the first end, and an arcuate section disposed therebetween;
      the gripping springs are disposed on the system such that the first ends are pivotally coupled to the system, and the arcuate sections oppose each other so as to define an opening through which the cylindrical object is inserted; and
      the actuator is mechanically coupled to at least one of the second ends of the gripping springs such that movement of the actuator causes the arcuate sections of the gripping springs to grip the cylindrical object when inserted into the opening;
   the plurality of gripping devices are disposed on the indexing table, such that the indexing table is configured to mechanically couple the decapping assembly to one of the plurality of gripping devices; and
   the decapping assembly is configured to remove the cap from the cylindrical object.

9. The system of claim 8, wherein the indexing table is rotatable.

10. The system of claim 8, wherein the plurality of gripping devices comprises three gripping devices disposed on the indexing table.

11. The system of claim 8, wherein the actuator of each gripping device comprises a cam mechanically coupled to the indexing table such that the cam causes the cylindrical object to be gripped by the gripping springs of the gripping device mechanically coupled to the decapping assembly.

12. The system of claim 8, wherein the cylindrical object comprises a test tube.

13. The system of claim 8, wherein the gripping devices prevent rotation of the cylindrical object when the cap is removed by the decapping assembly.

14. The system of claim 8, wherein each gripping spring further comprises a high-friction material disposed on the arcuate sections.

15. The system of claim 8, wherein the decapping assembly comprises a cap gripping device configured to grip and remove the cap from the cylindrical object.

16. The system of claim 15, wherein:
   the cap gripping device comprises two cap gripping springs and a cap gripping actuator;
   each of the two cap gripping springs comprises a first end, a second end opposite the first end, and an arcuate section disposed therebetween;

the two cap gripping springs are disposed on the cap gripping device such that the first ends are pivotally coupled to the cap gripping device, and the arcuate sections oppose each other so as to define a cap opening through which the cap is inserted; and the cap gripping actuator is mechanically coupled to at least one of the second ends of the two cap gripping springs such that movement of the cap gripping actuator causes the arcuate sections of the two cap gripping springs to grip the cap when inserted into the cap opening.

17. A method for gripping a cylindrical object with two gripping springs, the method comprising:

inserting the cylindrical object into the opening of the device of claim 1; and actuating the two gripping springs such that the arcuate sections engage the cylindrical object so as to grip the cylindrical object and prevent its rotation.

18. The method of claim 17, wherein the cylindrical object comprises a test tube or a cap for a container.

19. The method of claim 17, wherein actuating the two gripping springs is caused by a rotational motion of a rotary actuator or a linear motion of a linear actuator.

20. The method of claim 17, wherein each gripping spring further comprises a high-friction material disposed on the arcuate sections.

* * * * *